Aug. 21, 1962  H. T. VAN DER WISSEL  3,050,318
BOX-AND-PIN TYPE THREADED JOINT
Filed Oct. 29, 1959  5 Sheets-Sheet 1

INVENTOR
H.T. VAN DER WISSEL
BY J. H. McCarthy
HIS AGENT

BOX-AND-PIN TYPE THREADED JOINT

Herman Tobias van der Wissel, The Hague, Netherlands, assignor to Shell Oil Company, a corporation of Delaware
Filed Oct. 29, 1959, Ser. No. 850,505
Claims priority, application Netherlands Oct. 31, 1955
8 Claims. (Cl. 285—334)

This invention relates to a cylindrical box-and-pin type threaded shrink-type joint. The cylindrical box-and-pin type threaded shrink-type joint according to the invention is characterized in that at least one of the screw threads in an unloaded state deviates from a normal cylindrical screw thread (it being understood that both screw threads do not deviate in the same way) in such a way that after the box has been shrunk tight around the pin, but without plastic deformation, the outer flanks of the thread of the pin and the inner flanks of the thread of the box are more heavily loaded than the other flanks.

The invention also relates to a tapering box-and-pin type threaded joint, in particular for drilling operations, in which one or both screw threads deviate from a normal tapering thread (it being understood that both screw threads do not deviate in the same way) in such a way that, after the box has been screwed or shrunk tight around the pin, but without plastic deformation, the outer flanks of the thread of the pin and the inner flanks of the thread of the box are more heavily loaded than the other flanks, according to U.S. patent application No. 582,357, filed May 3, 1956.

By the outer flanks (inner flanks) of the screw thread are meant the flanks turned away from (turned towards) the middle of the screw thread; by cylindrical thread is meant a screw thread of which the flank diameter is substantially the same over the entire length, unlike tapering thread; by normal cylindrical thread is understood a thread of which the pitch and the flank diameter are the same over the entire length, while, in addition, by normal cylindrical thread is meant a thread of which the pitch and the taper are the same over the entire length, but in which the taper is so small (e.g. smaller than 1°) that the thread cannot be referred to as a tapering thread. By screw thread is only meant that part of a screw thread which is in engagement in the joint. The outer flanks of the thread of the pin and the inner flanks of the thread of the box are occasionally referred to hereinafter as "loaded flanks" and the other flanks as "unloaded flanks."

The joint according to the invention is much stronger than the known joints, which can be explained by the fact that no wedging effect occurs in the root of the thread, the loaded flanks are substantially equally loaded, with the result that local overloading is prevented, and the thread part of the pin is under compression.

According to the invention the screw threads of the pin and box in an unloaded state should show certain differences; as regards the result it is immaterial whether these differences are obtained by making the screw thread of the pin, the screw thread of the box, or both screw threads, to vary from the normal cylindrical thread. In connection with the manufacture it is desirable, however, for either the pin or the box to be provided with a normal cylindrical thread.

The nature of the deviations (in an unloaded state) is such that the pin and box in an unloaded and cold state may have the same pitch, while the middle of the screw thread on the pin and/or box is provided with a local variation of pitch, and the difference between the flank diameters of the pin and box screw thread at the middle of the screw threads is greater than at the ends. Further, both the thread of the pin and the thread of the box may have a constant pitch, the pitch of the thread of the pin being somewhat greater than the pitch of the thread of the box. In this case the difference between the flank diameters of the pin and box screw thread should be smaller at the middle of the screw threads than at the ends thereof.

Moreover, the pitch of at least one of the threads may change gradually, the pitch of the thread of the pin being greater than the pitch of the thread of the (cold) box, while the difference in pitch is greatest at the middle of the screw threads of the pin and box. In this case the variation of the difference in pitch is preferably gradual, and the box is provided with normal cylindrical thread.

The invention will be further illustrated with reference to the diagrammatic drawings in which.

Figure 1:
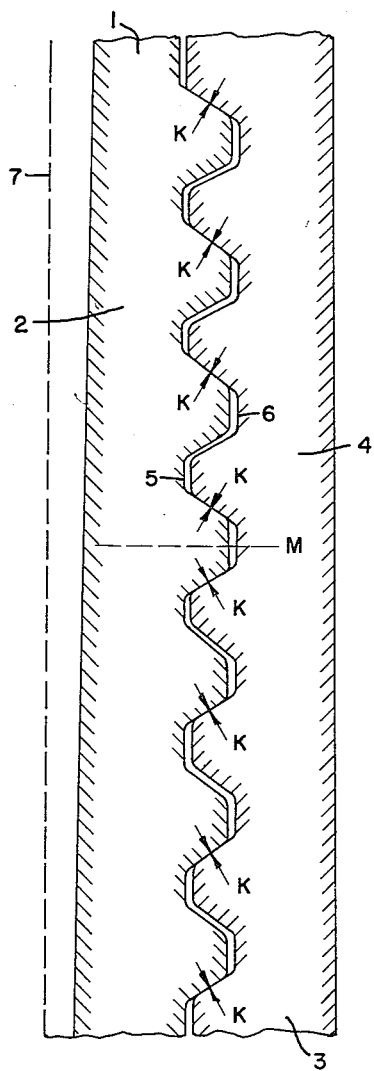
FIGURE 1 represents a cross-section of a cylindrical joint of two members shrunk tightly together.

FIGURE 1 shows a member 1 with a pin 2 on which is shrunk a member 3 with a box 4. The pin 2 is provided with a screw thread 5 which mates with a screw thread 6 of the box 4. The longitudinal axis of the joint is indicated by 7. The outer flanks of the screw thread 5 are in contact with the inner flanks of the screw thread 6 and are loaded with a specific load K. Between the remaining unloaded flanks is a helical slit. Other forces, not indicated, besides the forces K may be exerted on the joint, e.g. external forces and shoulder forces.

The external forces are assumed to be given, while the forces K and any shoulder forces may be selected, taking into account the permissible stresses. In the state outlined in FIGURE 1, as a result of the axial components of the forces K, the pin 2 is shortened and the box 4 lengthened as compared to the unloaded state; the ends of the pin 2 have come closer to the middle M, and the ends of the box 4 have moved farther from the middle M. In addition, the radial components of the internal forces also give rise to deformations. All these deformations and relative displacements may be calculated, in which case the material properties should be given.

Figure 2:
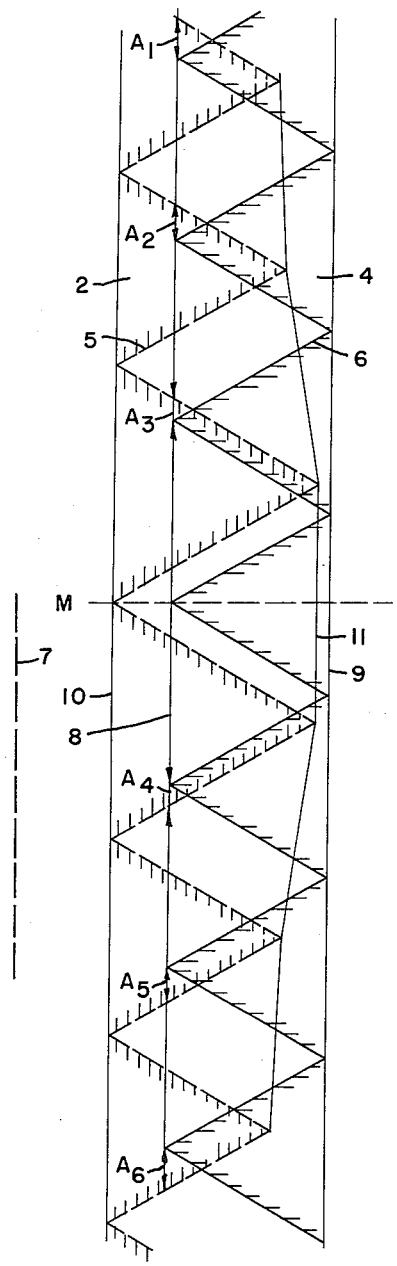
FIGURES 2, 3 and 4 are diagrammatic views showing various embodiments of unloaded, cold pin-and-box screw threads.
Figure 3:
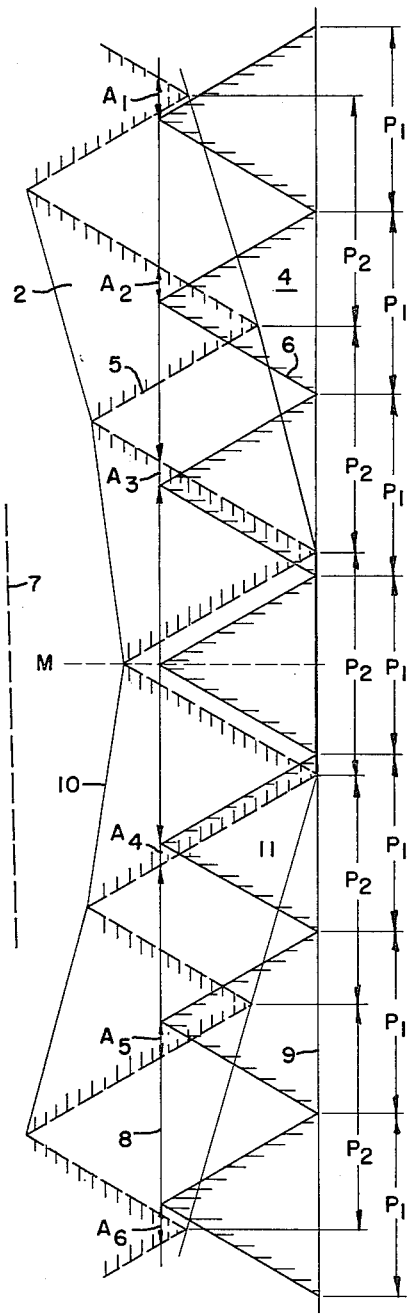
Figure 4:
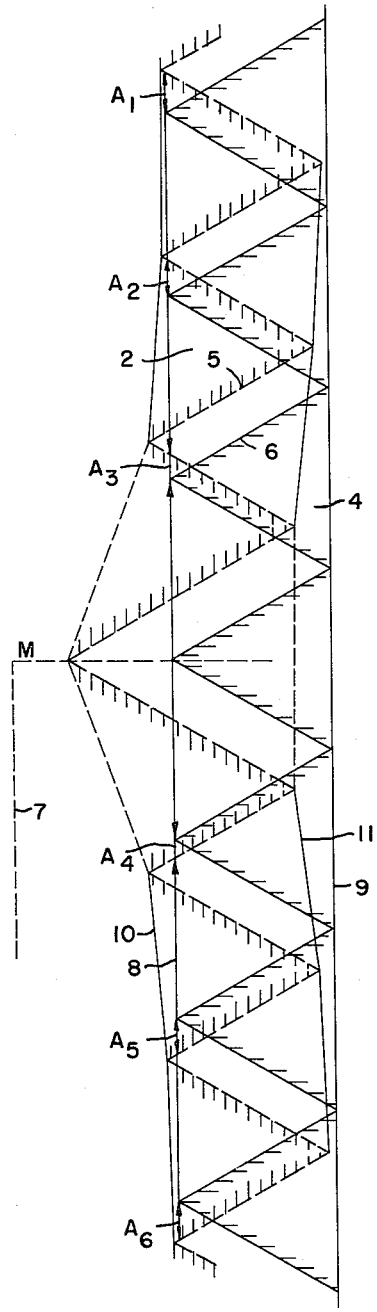

FIGURES 2, 3 and 4 each show diagrammatically a cross-sectional view of a part of the screw thread of an unloaded pin and of an unloaded, cold box. In this illustrated condition it is to be assumed that, starting from a shrink-type joint, the axial forces exerted on the pin and box have been removed, thus holding the middle M in place. The screw threads of pin and box consequently are shown as overlapping each other partly in FIGURES 2, 3 and 4. The axial overlap of the loaded flanks is indicated in the figures by $A_1$, $A_2$, $A_3$, $A_4$, $A_5$ and $A_6$; this overlap is substantially equal to the total of the relative displacements to be calculated of the loaded flanks of the pin-and-box screw thread with respect to the middle M. The overlap is also affected by the radial components of the internal forces.

Thus, the screw-threaded joint may be described as being formed so that, in a longitudinal cross-sectional view of both the box and the pin in unloaded condition with the axes of said box and pin coinciding, and planes perpendicular to the axes intermediate the two ends of the threaded portions of the box and the pin coinciding, the turns of the two threads overlap to an increasing extent from said planes towards both ends of the threaded portions, the rate of increase of said overlap decreasing from said planes towards both ends.

FIGURES 2, 3 and 4 show a box 4 with a normal cylindrical thread 6; lines 8 and 9 which in the cross-section connect the tops and the roots of the thread, respectively, are straight and parallel to the axis 7. In addition, the axial overlaps $A_1$, $A_2$, $A_3$, $A_4$, $A_5$ and $A_6$ are the same in these figures (this means, therefore, that account has been taken in all cases of the same load) so that the position of the outer flanks of the thread 5 of the pin 2 is also the same in all these figures. The relative position of the inner flanks of the screw thread 6 and the outer flanks of the screw thread 5 in an unloaded state is of primary importance, but the position of the outer flanks of the screw thread 6 and the inner flanks of the screw thread 5 may be chosen relatively at will.

In the embodiment shown in FIGURE 2 the position of the inner flanks of the screw thread is such that the pitch of the thread 5 is greater than the pitch of the thread 6 and the line 10, which in the cross-section connects the thread roots of the thread 5, is straight and parallel to the axis 7. As a result the line 11, which in the cross-section connects the thread tops of the thread 5, is convex towards the right, viz. the pitch of the thread 5 gradually changes, and the variation of the difference in pitch between thread 5 and thread 6 is also gradual, and the difference in pitch between the thread 5 and thread 6 is greatest at the middle M. It is clear that line 11 may also be made straight and line 10 convex to the left, or line 8 convex to the right, or line 9 convex to the left. Two or more lines may also be bent; the shapes shown in FIGURE 2 can, however, be made with relative ease. Another possibility is to imagine the slits in FIGURE 1 between the unloaded flanks as closed, in which case these flanks exert no forces on each other, or only forces which are small compared to the forces K. It can afterwards be calculated how wide the slits become between the unloaded flanks in FIGURE 2. In this manner the position of the inner flanks of the screw thread 5 is also determined; the deviations of the screw thread are thereby made more complicated, but a sealing connection can be made in this way.

FIGURE 3 shows an embodiment in which the inner flanks of the thread 5 are so situated that the thread 5 has a constant pitch $p_2$ which is greater than the pitch $p_1$ of the thread 6. In this construction the difference between the flank diameters of the threads 5 and 6 is greatest at the ends of the threads (by flank diameter is understood twice the distance from the axis 7 to the middle of the flank). In FIGURE 3 the lines 10 and 11 are convex towards the right; alternatively, lines 8 and 9 may be convex towards the left, or lines 8 and 9 as well as 10 and 11 may be bent.

FIGURE 4 shows an embodiment in which the inner flanks of the thread 5 are so situated that the thread 5 has a constant pitch which is the same as the pitch of thread 6, but in which the thread 5 shows a local variation of pitch at the middle M, according to FIGURE 4 consisting of a groove with a larger pitch, but which may also consist of an interruption of the thread; the thread 6 or the threads 5 and 6 may also show a variation of pitch locally. In this construction the difference of the flank diameters of the threads 5 and 6 is greatest at the middle M.

It is clear that the threads may also show other deviations provided the relative position of the loaded flanks remains unchanged. (When at least the desired load and the material properties also remain the same.)

Figure 5:
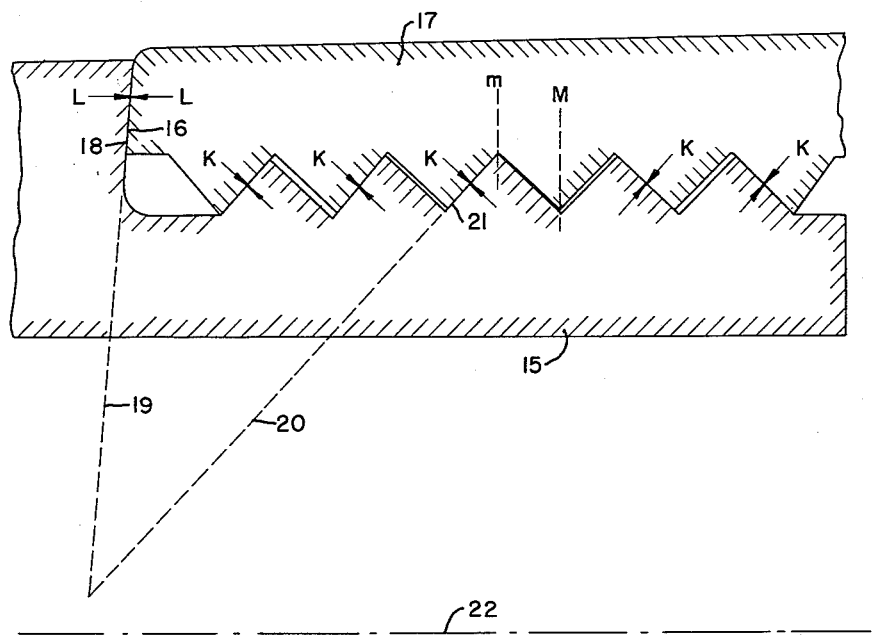
FIGURE 5 shows a cross-section of a cylindrical shrink-type joint with shoulder.

Reference has been made in the foregoing to the middle M; by this is understood the point at which the inner and outer flanks merge (this follows from the definition of inner and outer flanks), viz. the place at which the compression or tension is greatest. The middle M, in a joint without shoulders, is in the true middle of the screw thread, when at least the greatest tensile and compressive forces which the joint has to be capable of transmitting are equal to each other. It follows, however, from the equilibrium of the axial components of the various forces that in the case of shoulder forces and/or external forces the middle M need not generally coincide with the true middle m of the screw threads. This is indicated in FIGURE 5. In this figure, the pin 15 is provided with the shoulder 16, and the box 17 with a shoulder 18. The shoulder force is L. The middle M is at a greater distance from the end of the box 17 and at a smaller distance from the end of the pin 15 than the true middle m.

In order to obtain a good sealing between the shoulders 16 and 18, it is desirable that the lines 19 and 20 which in the cross-section lie in line with the shoulders 16 and 18 and with the flank 21, respectively, where, in effecting the joint, the first contact occurs between the threads of the pin 15 and the box 17, should intersect above the axis 22 of the joint.

The deviations shown in the figures are exaggerated; in reality the deviations will be very small, so that the forces necessary for causing deformations do not put a prohibitive load on the pin and the box.

The manufacture of the screw thread of the pin and/or box of a joint according to the invention causes more difficulties than the manufacture of normal screw thread. These difficulties are, however, overcome by making use of special accessories in cutting the screw threads on a screw-cutting lathe. Thus, the desired deviations in the taper can be obtained by using a taper-turning attachment which has the desired deviations. A small constant difference in pitch between the two threads can be obtained by using suitable change wheels (for one thread a change wheel, for example, with 400 teeth may be used and for the other thread a change wheel with 401 teeth). In order to obtain the desired variations in pitch in a thread to be cut, the lead screw nut connected to the tool post and moved by the lead-screw may be given, instead of a translated movement only, and (additional) turn, during its movement, with respect to the axis of the lead-screw, by means of a jig which guides this turn, since by turning the lead-screw nut in the same direction as the lead-screw, the pitch is reduced, and by turning the lead-screw nut in the opposite direction the pitch is increased.

It has been found that an embodiment of the threaded joint not described in U.S. patent application No. 582,357, filed May 3, 1956, has particular advantages. According to another embodiment of the present invention the pitch of at least one of the threads changes gradually in an unloaded state, the pitch of the thread of the box being smaller than the pitch of the thread of the pin, while the difference in pitch is greatest at the middle of the screw threads of the pin-and-box. The box is preferably provided with a normal tapering thread and the variation in the difference of pitch is gradual. Advantages of the threaded joint according to the invention are that the manufacture thereof is relatively simple and that the joint may also have a sealing design.

Figure 6:
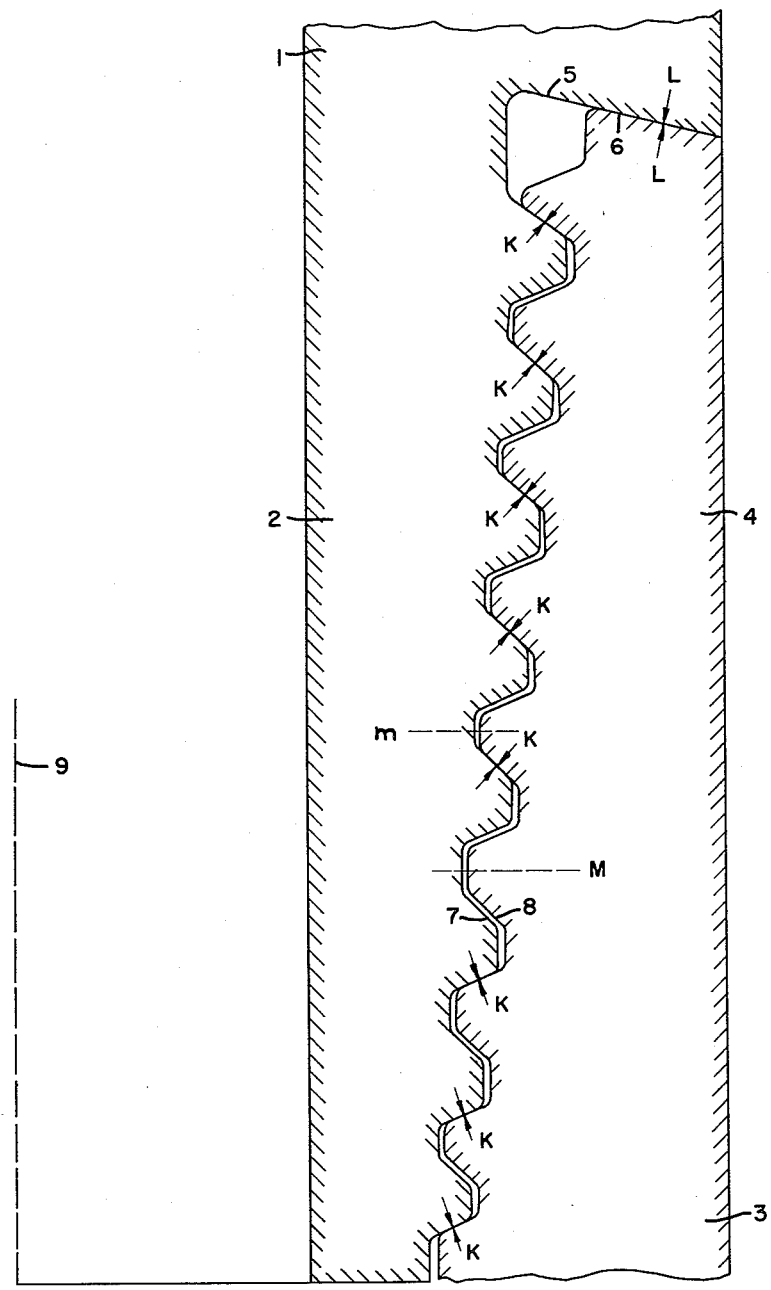
FIGURE 6 represents a cross-section of a tapered joint of two drill collars screwed tightly together; and, FIGURE 7 is a part of a tapered joint according to the invention screwed handtight.

According to FIGURE 6, a drill collar 1' with a pin 2' is connected to a drill collar 3' with a box 4'. The drill collar 1' is provided with a shoulder 5' which exerts a force L on a shoulder 6' of the box 4'. The pin 2' is provided with a screw thread 7' which mates the screw thread 8' of the box 4'. The longitudinal axis of the drill collars is indicated by 9'. The outer flanks of the screw thread 7' are in contact with the inner flanks of the screw thread 8' and are loaded with a specific load K. There is a helical slit between the remaining, unloaded flanks. External forces, not indicated, can also be exerted on the joint; K and L are internal forces.

Figure 7:
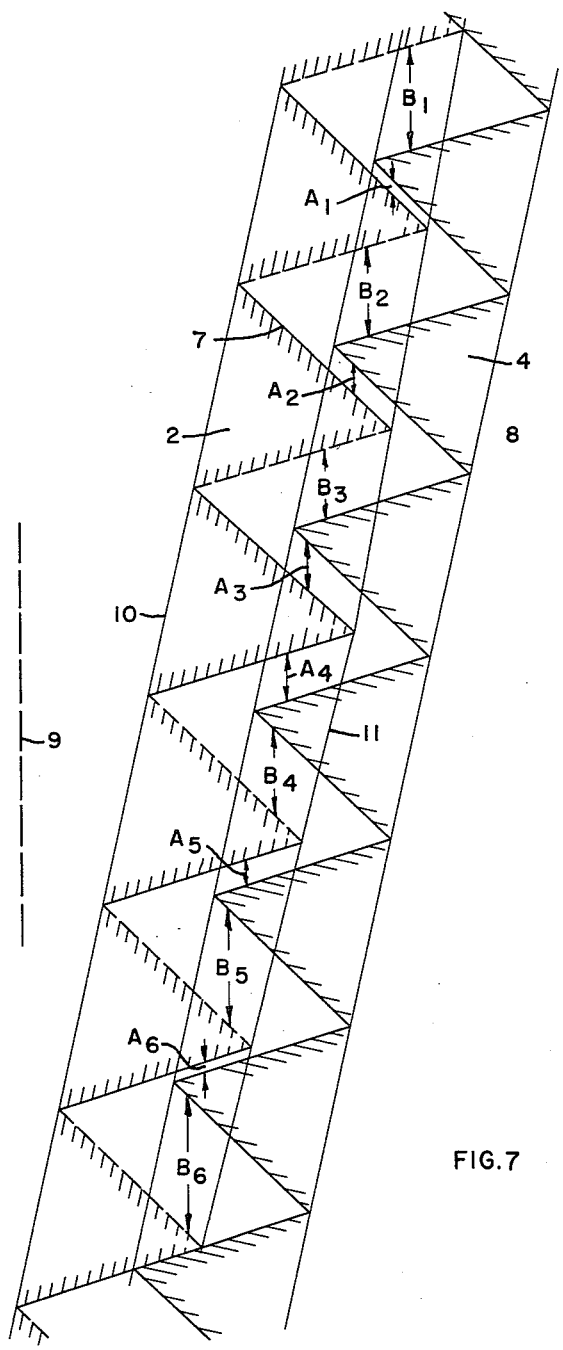

The external forces are assumed to be given, while the internal forces may be selected, taking into account the permissible stresses. In the state outlined in FIGURE 6, as a result of the axial components of the internal stresses, the pin 2' is shortened and the box 4' lengthened as compared to the unloaded state; the ends of the pin 2' have come closer to the middle M and the ends of the box 4' have moved farther from the middle M. In addition, the radial components of the internal forces also give rise to deformations. All these deformations and relative displacements may be calculated, to which end the material properties should be given. When the pin and box are now screwed handtight, the outer loaded flanks will, as shown in FIGURE 7, make contact, at each end theoretically along one line, while a slit remains open between the other loaded and unloaded flanks. The axial width of the slit between the loaded flanks should now substantially correspond for each point with the total of the calculated shortening of the pin between the relevant point and the end of the screw thread of the pin and the calculated lengthening of the box between the relevant point and the end of the screw thread of the box (in this case the end should be taken which is on the same side as the middle M as the relevant point). The slit widths are also affected by the radial components of the internal forces.

In FIGURE 7, the screw thread 8' of the box 4' is a normal tapering thread. Starting from this thread 8', the slit widths ($A_1$, $A_2$, $A_3$, $A_4$, $A_5$ and $A_6$) are now set out. The place of the outer flanks of the screw thread 7' of the pin 2' is thereby determined; to a certain extent, however, there is a free choice as to where the inner flanks of the screw thread 7' of the pin 2' are placed.

According to FIGURE 7, the line 10', which in the cross-section connects the roots of the thread of the screw thread 7' of the pin 2', is straight and parallel to the lines which in the cross-section connect the roots and tops of the threads of the screw thread 8' of the box 4', while the line 11' which connects the thread tops of the screw thread 7' of the pin 2', is accordingly convex towards the right. The pitch of the screw thread 7' of the pin 2', and the pitch of the screw thread 8' of the box 4' are substantially the same at the ends. This is the construction which can be most simply made, but the line 10' or the line 11' may be chosen relatively at will. In the embodiments outlined in the main application, in which the pitch of the pin and box does not change, or only locally, the place of the inner flanks of the screw thread of the pin is fixed, viz. when in FIGURE 7, starting from the slits $A_1$, $A_2$, $A_3$, $A_4$, $A_5$ and $A_6$, viz. uniform load of the loaded flanks, for example, it is desired to keep a specific difference in pitch $p_2-p_1$, there is no degree of freedom. On the one hand the joint according to the invention is thereby easy to construct, and on the other this freedom enables a sealing joint to be made. The slits between the unloaded flanks in FIGURE 6 may, in fact, be imagined as closed (unloaded or loaded by a force which is small compared to the force K) and calculating back, it can be determined how large the slits $B_1$, $B_2$, $B_3$, $B_4$, $B_5$ and $B_6$ should be between the unloaded flanks. In this case the deviations of the normal tapering thread will become more complicated.

Reference has been made in the foregoing to the middle M; by this is understood the point at which the inner and outer flanks merge (this follows from the definition of inner and outer flanks), viz., the place at which the compression or tension is greatest. It follows from the equilibrium of the axial components of the various forces that the middle M need not generally coincide with the true middle of the screw threads. Thus, in FIGURE 6, in connection with the shoulder force L, the middle M is between the true middle $m$ and the thick end of the pin 2'.

This application is a continuation-in-part of U.S. patent applications, Serial Nos. 618,909 and 618,910, both filed October 29, 1956.

I claim as my invention:

1. A box-and-pin type threaded joint comprising a pair of members adapted to be jointed together coaxially, a ox having a screw-threaded portion formed thereon and comprising one of said members, a pin having a screw-threaded portion formed thereon and comprising the other of said members, at least one of the screw threads in an unloaded state deviating from the other screw thread in a manner such that, in a longitudinal, cross-sectional view of both the box and the pin in an unloaded condition with the axes of said box and pin coinciding, and with reference planes taken perpendicular to the axes intermediate the two ends of the threaded portions of the box and the pin coinciding, the turns of the two threads overlap to an increasing extent from said planes towards both ends of said screw-threaded portions, the rate of increase of said overlap decreasing from said planes towards both ends of said screw-threaded portions, said screw-threaded portions of said box and pin being formed with the degree of said varying overlap of the threads in both directions from said planes being such that threaded portions are substantially equally loaded with the threads on substantially one-half of the threaded portions being loaded in one direction while those on the other half are loaded in the opposite direction.

2. A joint according to claim 1 wherein in the unloaded position there exists a difference in pitch between the thread of the box and the thread of the pin which is a continuous function of the screw thread length, the pitch of the thread of the pin being greater than the pitch of the thread of the (cold) box, while the difference in the pitch is greatest at the middle of the screw threads of the pin and the box.

3. A joint according to claim 1, wherein at least one of said screw threads is a normal cylindrical thread.

4. A joint according to claim 2 wherein the variation of the difference in pitch is gradual and continuous.

5. A joint according to claim 2 wherein the box is provided with normal cylindrical thread.

6. A tapering box-and-pin-type threaded joint, comprising a pair of members adapted to be jointed together coaxially, a box having a screw-thread formed thereon and comprising one of said members, a pin having a screw thread formed thereon and comprising the other of said members, the threads of said pin and box being formed in a manner such that, at least one of said screw threads deviate from a normal tapering thread in such a way that, after the box has been tightly disposed around the pin, without loading the said threads to cause plastic deformation, the outer flanks throughout the length of the thread of the pin and the inner flanks throughout the length of the thread of the box are more heavily loaded than the other flanks, and wherein in an unloaded state there exists a pitch difference between the thread of the box and the thread of the pin which is a continuous function of the screw thread length, the pitch of the thread of the box through the length thereof being smaller than the pitch of the thread of the pin, while the difference in pitch is greater at the middle of the screw threads of the pin and box than at either of the ends thereof.

7. A joint according to claim 6, wherein the box is provided with a normal tapering thread.

8. A joint according to claim 6, wherein the variation in the difference of pitch is gradual and continuous.

References Cited in the file of this patent

UNITED STATES PATENTS

| | | |
|---|---|---|
| 1,851,714 | McCullough | Mar. 29, 1932 |
| 1,922,689 | Linnenbruegge | Aug. 15, 1933 |
| 2,035,055 | Dyer | Mar. 24, 1936 |
| 2,356,098 | Steinle | Aug. 15, 1944 |